United States Patent
Vicari

[15] 3,706,321
[45] Dec. 19, 1972

[54] MANUAL OVERRIDE INDICATOR FOR GATE VALVE

[72] Inventor: Felix J. Vicari, Houston, Tex.

[73] Assignee: ACF Industries, Incorporated, New York, N.Y.

[22] Filed: Sept. 21, 1971

[21] Appl. No.: 182,343

[52] U.S. Cl. ................................................. 137/554
[51] Int. Cl. ........................... F16k 37/00, F16k 3/02
[58] Field of Search ............................. 137/553, 554

[56] References Cited

UNITED STATES PATENTS 2,940,070  6/1960  Sanders ........................... 137/554 X
3,029,060  4/1962  Anderson ............................. 251/14

Primary Examiner—Henry T. Klinksiek
Attorney—Eugene N. Riddle

[57] ABSTRACT

A visual indicator or signal for indicating when the manual override is being employed in a fluid operated gate valve. The manual override is employed to open the gate valve upon a malfunctioning of the fluid system and the indicator shows when the manual override is being employed. The signal is energized upon the initial actuation of the manual override and remains energized until the gate has returned to its full closed position under the manual override in which position the gate valve may return to its fluid operation.

6 Claims, 4 Drawing Figures

INVENTOR.
FELIX J. VICARI

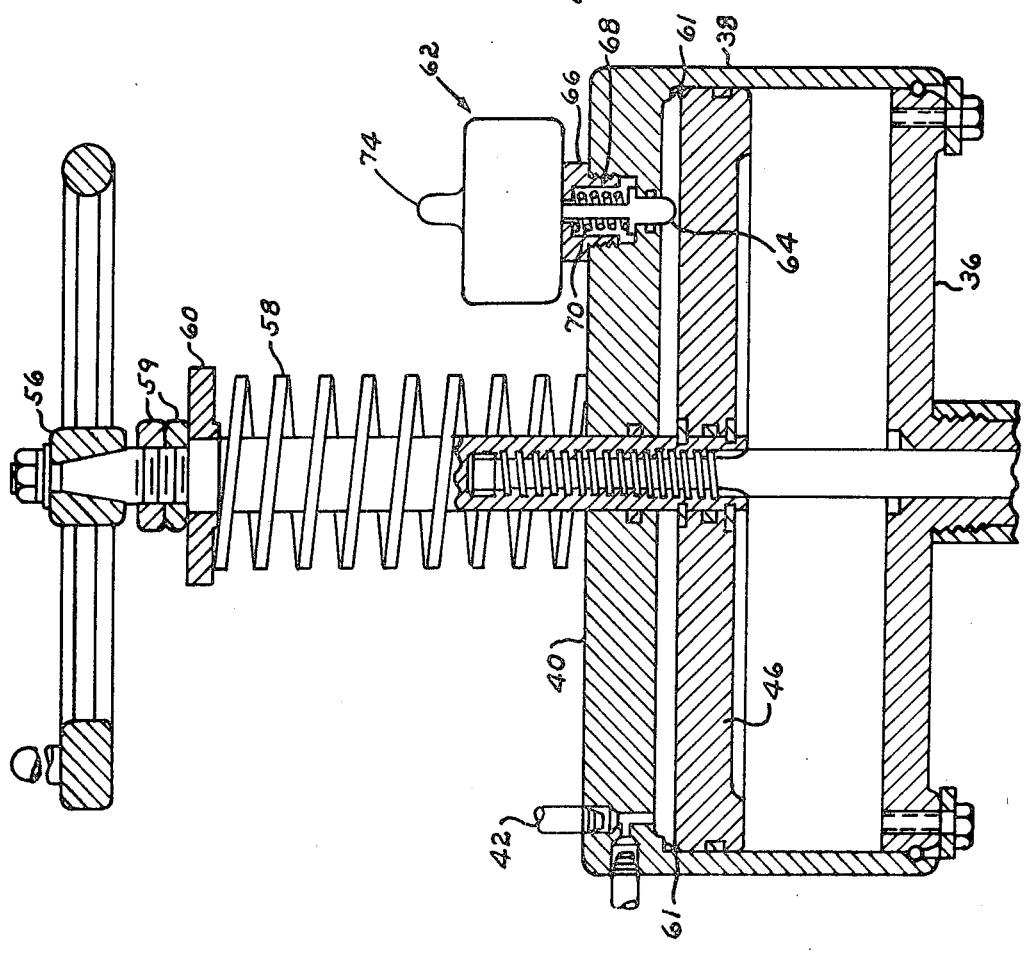

MANUAL OVERRIDE INDICATOR FOR GATE VALVE

BACKGROUND OF THE INVENTION

Gate valves for pipelines and the like may be remotely opened and closed by pneumatic or hydraulic actuators. In the event of a malfunctioning of the actuator, such as a break in a fluid line, the gate normally moves to a closed position with respect to the flowway. At times it is desired to open the gate valve when a malfunction in the fluid system occurs and a manual override, normally comprising a handwheel operator, is oftentimes provided to permit a manual movement of the valve. Upon a correction of the malfunctioning in the fluid system the manual override system is normally returned to its original inoperable position and the gate valve is again operated by fluid controls. In some instances, the manual override by inadvertence might not be returned fully to its original inoperable position before fluid operation is commenced and if so, this might prevent the gate valve from being fully opened or closed upon such subsequent fluid operation.

The present indicator or signal device is particularly adapted for use with a manual override of the type shown in U.S. Pat No. 3,029,060 issued Apr. 10, 1962, the entire disclosure of which is incorporated by this reference. In this arrangement a rising stem valve is provided with a piston operator and a gate having a port in its upper half. To insure that the valve will automatically completely close in the event of a failure in the fluid system, a spring attached to the top of the operator will automatically completely close the gate valve. In the event the port is located in the bottom half of the gate, the gate valve will automatically open upon failure of the fluid control system. To permit manual operation of the valve after such failure and automatic positioning, manual operating means are provided. The stem of the valve is threaded into the shaft of the manual operator by rotating a handwheel attached to the operator shaft. Upon rotation of the handwheel in one direction, the valve stem and the operator shaft unthread for driving the gate.

BRIEF DESCRIPTION OF THE INVENTION

The present invention provides a signal or indicator which shows when the handwheel override is employed and continues to provide such a signal until the override has been returned to the full closed position of the gate valve. With an override of the type shown in the aforementioned U.S. Pat. No. 3,029,060 the piston moves upward slightly before the manual override drives the gate valve. Upon such slight upward movement of the piston, contact is made by the piston with electrical circuitry for energizing the indicator or signal. The indicator is visually detectable and preferably comprises a glow lamp which may be located either adjacent the actuator or a position remote from the actuator. The piston remains in operable contact with the circuitry for the entire operating sequence of the handwheel and thus, the indicator will remain energized until the handwheel override is completely disengaged from the gate valve operation. Thus, it may be easily determined if the handwheel override is in its full non-operative position.

The invention accordingly comprises the constructions hereinafter described, the scope of the invention being indicated in the following claims.

In the accompanying drawings, in which one of various possible embodiments of the invention is illustrated, FIG. 1 is a sectional view of a gate valve structure and a pneumatic cylinder operator for the gate valve, and employing the manual override indicator comprising the present invention;

FIG. 2 is a section of the upper portion of the gate valve structure shown in FIG. 1 with the gate valve shown in a closed position and the manual override indicator in inoperable position and in section;

FIG. 3 is a section similar to FIG. 2 but showing the manual override in operation with the gate valve in an open position and the indicator energized.

Figures 1, 4:
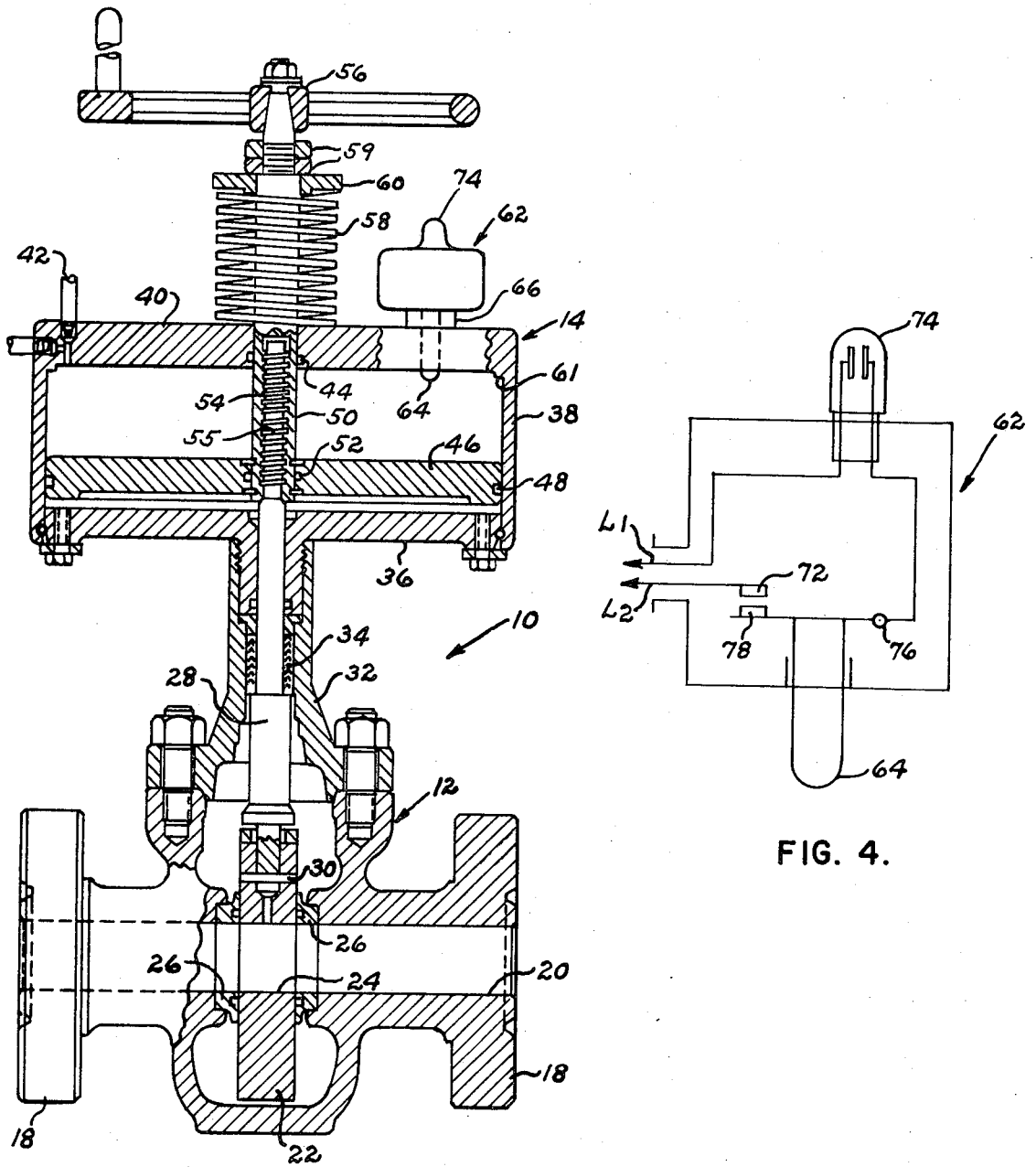
FIG. 4 is a diagrammatic view of the electrical circuitry for energizing the visual signal of the indicator.

Referring now to the drawings, gate valve structure 10 includes a lower gate valve body generally indicated 12 and an upper pneumatic piston operator generally indicated 14. Valve body or housing 12 has flanged ends 18 and a central bore 20 forming a flowway. A gate valve member 22 has a port 24 therein adapted for alignment with bore 20 in the open position of valve member 22 as shown in FIG. 1. Valve seats 26 on valve body 12 provide a tight-sealing relationship with valve member 22. A valve stem generally indicated 28 is pivotally connected at 30 adjacent its lower end to gate valve member 22 and extends through a bonnet 32 and packing 34.

Attached to the top of bonnet 32 is piston operator 14 having a base member 36 threadedly attached to the top of bonnet 32, a piston cylinder 38, and a cap 40 closing the top end of piston cylinder 38. Air is supplied to cylinder 38 through port 42. An O-ring seal 44 is located in a groove in the cap 40 to hold pressure in cylinder 38 between cap 40 and sliding piston 46 which is the working mechanism of the operator. To make the area between piston 46 and cap 40 a pressure area, the circumferential edge of piston 46 is provided with a seal 48. Piston 46 is attached to an operator shaft 50. Various O-ring seals 52 are utilized to prevent leakage around shaft 50. The lower end of shaft 50 has a bore provided with internal female threads 54 which are threadedly engaged with external male threads 55 on the upper end of stem 28. Operator shaft 50 extends through cap 40 and its upper end is formed to receive a handwheel 56. A spring 58 is interposed between cap 40 and a spring retaining collar 60 which is retained in position by nuts 59 threadedly attached to the shaft.

Assuming that gate 22 is in the position shown in FIG. 1 and the pressure on the top of piston 46 fails, the spring 58 being no longer opposed by the pressure holding it collapsed will expand to insure automatic closing of gate 22. The expansion of spring 58 will cause shaft 50 and stem 28 to move upward closing gate 22. This action will move piston 46 to the position shown in FIG. 2. If it is desired to open the valve before the restoration of the fluid control circuit, the valve can be opened by the manual operating means. To manually operate the valve, handwheel 56 is rotated. The direction of rotation will depend upon the direction of the thread. For example, if left hand threads are used, the rotation will be clockwise. The rotation of handwheel 56 causes the threads in the shaft 50 and on stem 28 to partially disengage. Since downward movement of stem 28 is resisted by drag of gate 22, resistance to the packing and pressure in the body, and there is no appreciable resistance to the upward movement of the piston, piston 46 will move upwardly until it strikes against circumferential ledge 61 on the bottom wall of cap 40 which forms a piston stop as shown in FIG. 3. When piston 46 contacts cap 40 piston 46 can no longer move and continued rotation of handwheel 56 will cause stem 28 to move downward thereby driving gate 22 to an open position. Spring 58 will be compressed slightly to balance against the internal friction of the valve. FIG. 2 illustrates the full closed position of gate valve member 22 under pneumatic operation with stem 28 engaging bonnet 32 to act as a stop for limiting upward movement of valve member 22. In this position, piston 46 is spaced from cap 40. To restore the valve to remove fluid operation, it is necessary to restore stem 28 and shaft 50 to full threaded engagement with piston 46 spaced slightly from cap 40 as shown in FIG. 2. To accomplish this, handwheel 56 is rotated in the direction opposite to that which it was rotated to manually operate the valve. If piston 46 is not returned to the position shown in FIG. 2, bore 24 in gate 22 will not be aligned properly with bore 20 upon opening of gate 22 by fluid operation. In the event that it is desired to lock the valve against remote operation, it can be left in manual position.

A manual override indicator generally indicated 62 includes a plunger 64 having an external housing 66 threaded within a bore 68 in cap 40 of housing 38. A spring 70 mounted within housing 66 continuously urges plunger 64 downwardly within the chamber of cylinder 38. Normally, as shown in FIG. 2 with piston 46 in its uppermost position under fluid operation and gate 22 in full closed position, piston 46 is spaced from the end of plunger 64 and does not energize manual override indicator 62. Therefore, no signal is indicated upon fluid operation.

However, upon rotation of handwheel 56 for moving valve 22 to an open position, such as might be desirable upon a malfunctioning in the fluid system, piston 46 moves upwardly slightly until it bottoms against the adjacent end cap 40 as shown in FIG. 3 in which position piston 46 is in contact with the end of plunger 64.

Referring particularly to FIG. 4, lines L1 and L2 lead to a suitable source of electrical energy (not shown) such as a battery. Line L2 is connected to a contact 72. Line L1 is connected to a visual signal, preferably a glow lamp 74. Plunger 64 is operatively connected to a switch 76 having a contact 78 thereon. Upon contact of piston 46 with plunger 64, contact 78 engages contact 72 thereby to energize glow lamp 74 to provide a visual indication of the actuation of the handwheel override. While glow lamp 74 has been illustrated as mounted adjacent the gate valve structure, it is to be understood that the lamp or other signal could be mounted on a control panel or the like remote from the gate valve structure, if desired.

Piston 46 remains in contact with the lower end of plunger 64 during the entire movement of gate valve 22 to its open position after actuation of handwheel 56. Upon correction of any malfunctioning in the fluid system and a desire to return to the fluid system, gate valve 22 must be returned to a closed position under operation of handwheel 56. During return of gate valve 22 to the closed position, the visual manual override indicator will remain energized until gate 22 is fully closed and piston 46 moves slightly away from end cap 40 to the position shown in FIG. 2 after gate 22 is fully closed. Upon such movement of piston 46, plunger 64 will be spaced from piston 46 as shown in FIG. 2 and manual override indicator 62 will be deenergized. In this position, fluid operation of gate 22 may be properly commenced.

It is to be understood that in some types of gate valve structures, the bore in the gate valve might be provided in the lower portion of the gate valve, instead of the upper portion as shown herein. It is to be understood that the present invention might be employed with such a gate valve if desired.

What is claimed is:

1. A gate valve structure having a reciprocable gate valve movable between open and closed positions across a flowway, a stem connected to the gate valve, a fluid operator including a piston mounted within a cylinder and operatively connected to the stem for moving the gate valve between open and closed positions, piston stop means within said cylinder being spaced from said piston during fluid operation of said piston, a manual override for manual operation of the gate valve between open and closed positions independently of the fluid operator comprising a manual operator shaft operatively connected to the stem and mounted for axial movement with the piston upon fluid operation of said gate valve, means permitting relative axial movement between the stem and operator shaft, upon relative rotation therebetween, manual means to rotate the operator shaft for effecting relative axial movement between said stem and said shaft, said piston upon initial rotation of said operator shaft moving with said shaft until the piston engages and bottoms out against said piston stop means whereupon further rotation of the operator shaft drives said stem and gate valve toward the flowway, and a visual indicator having an actuator extending within the cylinder generally adjacent said piston stop means, said actuator being contacted by said piston upon travel of the piston from its outermost position resulting from fluid operation to its position in engagement with the stop means resulting from manual operation thereby to provide a visual signal of the actuation of the manual override.

2. A gate valve structure having a reciprocable gate valve movable between open and closed positions across a flowway, a stem connected to the gate valve, a fluid operator including a piston mounted within a cylinder and operatively connected to the stem for moving the gate valve between open and closed positions, piston stop means within said cylinder being spaced from said piston during fluid operation of said piston, a manual override for manual operation of the gate valve between open and closed positions independently of the fluid operator comprising a manual operator shaft operatively connected to the stem and mounted for axial movement with the piston upon fluid operation of said gate valve, means permitting relative axial movement between the stem and operator shaft upon a relative rotation therebetween, manual means to rotate the operator shaft for effecting relative axial movement between said stem and said shaft, said piston upon initial rotation of said operator shaft moving with said shaft until the piston engages and bottoms out against said piston stop means whereupon further rotation of the operator shaft drives said stem and gate valve toward the flowway, and signal means actuated upon travel of the piston from its outermost position resulting from fluid operation to its position in engagement with the piston stop means resulting from manual operation to provide a signal of the actuation of the manual override.

3. A gate valve structure as set forth in claim 2 wherein said signal means includes an actuator extending within the cylinder generally adjacent its piston stop means and contacting the piston when the piston is in engagement with the stop means.

4. A gate valve structure as set forth in claim 3 wherein said actuator comprises a spring mounted plunger, extending inwardly from the outermost end of the cylinder to contact said piston, and electrical circuitry to energize said signal means when the piston is bottomed out against said stop means.

5. In a gate valve structure having a reciprocable gate valve movable between open and closed positions across a flowway, a stem connected to the gate valve, and a fluid operator including a piston mounted within a cylinder and operatively connected to the stem for moving the gate valve between open and closed positions; a manual override for movement of the gate valve between open and closed positions independently of the fluid operator comprising a rotatable handwheel, a shaft extending from said handwheel and having internal female threads threadedly engaged with male threads on the adjacent end of the stem, whereby rotation of the handwheel in one direction will effect unthreading of the stem and shaft, said piston being mounted for axial movement with said shaft and handwheel upon fluid operation of said gate valve, piston stop means within said cylinder being inoperable upon fluid operation, the rotation of said handwheel in said one direction effecting unthreading of the stem and shaft with said piston moving with said shaft until the piston engages said piston stop means to bottom out whereupon further rotation of the handwheel drives said stem and gate valve toward the flowway, and signal means operatively connected generally adjacent said piston stop means to provide a signal of the actuation of the manual override, said signal means being actuated upon travel of the piston from its outermost position resulting from fluid operation to a position in engagement with the piston stop means resulting from manual operation.

6. In a gate valve structure as set forth in claim 5, said signal means includes an actuator extending within the cylinder generally adjacent the piston stop means and contacting the piston when the piston is in engagement with the stop means.

* * * * *